Oct. 7, 1969     H. E. CAMPBELL     3,470,765
COUNTER DRIVE MOVEMENT APPARATUS
Filed Oct. 17, 1967
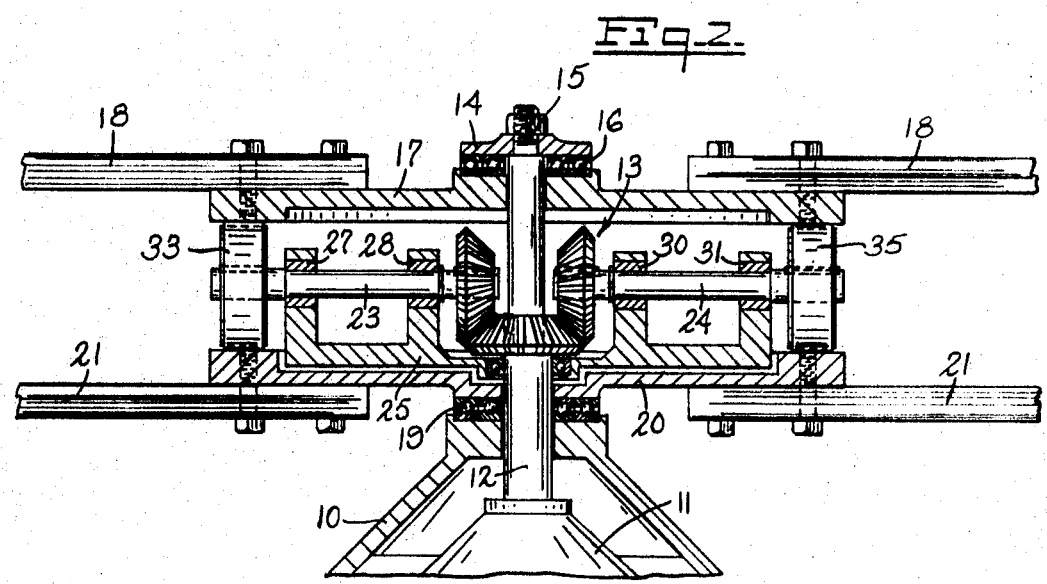
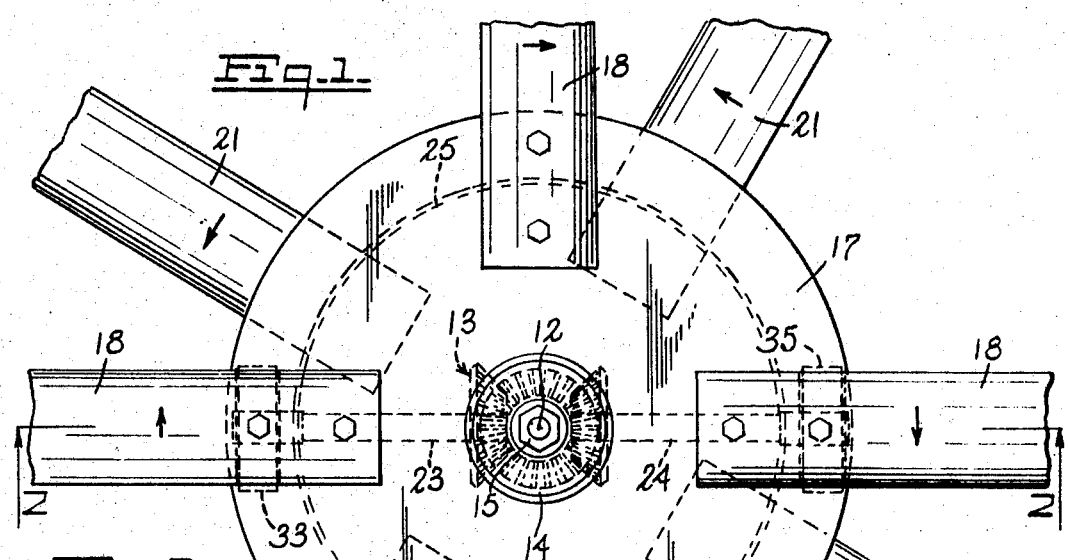
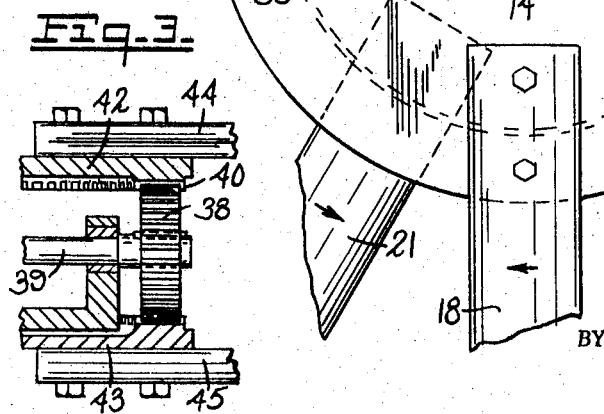
INVENTOR
Harold E. Campbell
BY De Lio and Montgomery
ATTORNEYS ated Oct. 7, 1969

3,470,765
COUNTER DRIVE MOVEMENT APPARATUS
Harold E. Campbell, 5 Coventry Circle,
North Haven, Conn. 06473
Filed Oct. 17, 1967, Ser. No. 675,970
Int. Cl. F16h 37/06, 15/08, 1/20
U.S. Cl. 74—665                              6 Claims

ABSTRACT OF THE DISCLOSURE

An apparatus for driving in opposite rotational directions two members mounted in substantially parallel planes to each other, comprising a drive shaft, a bevel gear coupled to said drive shaft for rotation therewith, two members adapted to be rotated about the axis of the drive shaft, one of said members positioned above and the other below said bevel gear, and roller means positioned between said two members and in frictional contact therewith for driving said members in opposite directions of rotation, said roller means rotatably driven from said bevel gear.

---

This invention relates to propulsion of aircraft or the like and, more particularly, relates to a drive apparatus for moving two members in opposite directions.

In the past, a plurality of propellers have been utilized, which are driven in opposite directions, to propel a helicopter, other aircraft, or a torpedo, through a fluid media. In the prior art, at least one of the propellers has always been driven directly and the other driven indirectly from the drive shaft. This has caused difficulties in the operation of the vehicle being propelled since there has not always been an even division of the power provided to rotate the propellers.

This invention overcomes these difficulties in that a mechanism is provided for driving two groups of propellers from a common drive shaft.

Accordingly, it is an object of this invention to provide a new and improved apparatus for driving members in opposite directions.

Another object of the invention is to provide a new and improved apparatus for indirectly driving two members in opposite directions from a single drive shaft.

Still other objects and advantages of the invention will in part be obvious and will in part be apparent from the specification.

The invention accordingly comprises the features of construction, combination of elements and arrangement of parts which will be exemplified in the construction hereinafter set forth and the scope of the invention will be indicated in the claims.

For a fuller understanding of the nature and objects of the invention, reference is had to the following description, taken in connection with the accompanying drawings, in which:

FIG. 1 is a top view of the apparatus according to this invention;

FIG. 2 is a sectional view taken along line 2—2 of FIG. 1; and

FIG. 3 is an alternate embodiment of the invention.

Referring to FIGS. 1 and 2, at 10 there is shown a housing, which may be that of a helicopter, in which there is supported a motor 11 for driving a drive shaft shown at 12. The driveshaft 12 is in turn coupled to a bevel gear arrangement generally shown at 13 which causes the bevel gear to rotate with the drive shaft. An end of the drive shaft 12 is coupled to an end cap shown at 14 held in place by a nut 15 on top of a bearing assembly 16, such as a roller bearing assembly. Below the bearing assembly 16 is a substantially circular plate 17 to which is attached a plurality of blades shown at 18.

Positioned above the housing 10 is a second bearing assembly 19 on which is mounted a second substantially circular plate 20, to which is attached a plurality of blades 21. In some cases the bearing assembly may be pinned to the shaft 12 to rotate therewith. The plates 17 and 20 are free to rotate about the shaft 12 between the bearing assemblies 16 and 19. Attached to the bevel gear 13 are two shafts shown at 23 and 24, which rotate in opposite directions due to their connection to the bevel gear arrangement. The shafts 23 and 24 are supported by a member 25, which is free to rotate above plate 20. The shaft 23 is free to rotate in bearings shown at 27 and 28 and shaft 24 is free to rotate in bearings 30 and 31 supported by the member 25. The shafts 23 and 24 are connected to rollers 33 and 35, respectively. The rollers 33 and 35 are preferably covered with a material having a high coefficient of friction, such as rubber or the like. It should be understood that the rollers themselves may be of a material having high coefficient of friction. The rollers 33 and 35 are positioned between the two plates, such that as the rollers rotate in opposite directions, the plates 17 and 20 also rotate in opposite directions to cause the blades 18 and 21 to follow. As may be observed, there is no direct connection between the drive shaft 12 and the two plates 17 and 20.

Referring now to FIG. 3, there is shown an alternate embodiment of this invention. In place of a roller for driving the members, there is provided a gear shown at 38 which rotates with a shaft 39. The gear 38 meshes with a circular rack 40. At 42 and 43 are shown the two plate members which in turn are coupled to propellers 44 and 45, respectively. In this manner, the two propellers are driven in opposite directions indirectly from the drive shaft.

Accordingly, this invention provides a new and improved method and apparatus for driving two members in opposite directions. It should be understood that this invention is applicable for use with aircraft, as well as other appliances, where it is desirable to rotate two members in opposite direction.

It will thus be seen that the objects set forth above, among those made apparent from the preceding description, are efficiently attained and since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. An apparatus for driving in opposite rotational directions two rotating members mounted in substantially parallel planes to each other, comprising a drive shaft, a first bevel gear coupled to said drive shaft for rotation therewith, two rotating members adapted to be rotated about the axis of the drive shaft, one of said members positioned above and the other below said bevel gear and both members free to rotate about said drive shaft, at least one secondary drive shaft having a second bevel gear at one end coupled to the first bevel gear, wherein said secondary drive shaft is supported for rotation by support means free to rotate about said drive shaft, and at least one roller means connected to the other end of said secondary drive shaft and positioned between said two rotating members and in contact therewith for driving said rotating members in opposite directions of rotation, said roller means being rotatably driven from said first bevel gear.

2. An apparatus in accordance with claim 1, wherein there is a plurality of roller means which are supported on a plurality of secondary drive shafts coupled to said first bevel gear by means of secondary bevel gears mounted on said secondary drive shafts, said secondary drive shafts being supported for rotation by support means free to rotate about said drive shaft.

3. An apparatus in accordance with claim 1, wherein said roller means are provided with a high coefficient of friction material about their contacting surfaces.

4. An apparatus in accordance with claim 1, in which the roller means are provided with gear teeth and the portions of the rotating members in contact with the roller means comprise a circular rack.

5. An apparatus in accordance with claim 1, wherein said rotating members comprise blades connected to plate means for engaging said roller means.

6. An apparatus in accordance with claim 1, wherein the rotating members comprise plates to which blades are coupled, said plates being in contact with said roller means.

References Cited

UNITED STATES PATENTS

| | | |
|---|---|---|
| 2,395,610 | 2/1946 | Cavallaro. |
| 2,936,971 | 5/1960 | Holmes _____ 244—17.23 X |
| 3,188,884 | 6/1965 | Bancroft. |
| 3,357,656 | 12/1967 | Peterson _____ 244—17.23 |

LEONARD H. GERIN, Primary Examiner

U.S. Cl. X.R.

74—201, 417, 713, 714; 244—17.23